(12) United States Patent
Stride et al.

(10) Patent No.: US 12,487,993 B2
(45) Date of Patent: Dec. 2, 2025

(54) OPTIMIZED DATABASE SYSTEM WITH UPDATED MATERIALIZED VIEW

(71) Applicant: Shopify, Inc., Ottawa (CA)

(72) Inventors: Derek Stride, Ottawa (CA); Oleksiy Kovyrin, Waterloo (CA)

(73) Assignee: SHOPIFY INC., Ottawa (CA)

( * ) Notice: Subject to any disclaimer, the term of this patent is extended or adjusted under 35 U.S.C. 154(b) by 113 days.

(21) Appl. No.: 18/326,667

(22) Filed: May 31, 2023

(65) Prior Publication Data
US 2024/0403288 A1 Dec. 5, 2024

(51) Int. Cl.
G06F 16/23 (2019.01)
G06F 16/2453 (2019.01)
G06F 16/27 (2019.01)

(52) U.S. Cl.
CPC .... *G06F 16/2393* (2019.01); *G06F 16/24535* (2019.01); *G06F 16/27* (2019.01)

(58) Field of Classification Search
CPC . G06F 16/2393; G06F 16/24535; G06F 16/27
See application file for complete search history.

(56) References Cited

U.S. PATENT DOCUMENTS

| | | | |
|---|---|---|---|
| 6,708,179 B1 * | 3/2004 | Arora | G06F 16/24539 |
| | | | 707/999.102 |
| 2019/0332698 A1 * | 10/2019 | Cho | G06F 16/2393 |
| 2022/0253433 A1 * | 8/2022 | Deshpande | G06F 16/2393 |

\* cited by examiner

*Primary Examiner* — Tyler J Torgrimson
(74) *Attorney, Agent, or Firm* — Foley & Lardner LLP

(57) ABSTRACT

The server hosting the database scans a binlog for database change events. When a log consumer identifies a change event indicating that certain database records were modified, the consumer pulls only the identifiers of the modified records from the binlog. The log consumer then populates and pushes only the identifiers of the modified records into a non-transitory storage location that is accessible to a database streaming bus. The streaming bus publishes the identifiers for consumption by instances of materialization workers. The hosting server invokes parallel processor threads to execute the materialization workers. The materialization worker rewrites a query script for constructing a materialized view of certain database records, including the modified database records indicated by the identifiers. The materialization worker executes the query script to construct the materialized view, which contains only the modified database records used for generating the database updates to commit to the database.

21 Claims, 5 Drawing Sheets

FIG. 2

OPTIMIZED DATABASE SYSTEM WITH UPDATED MATERIALIZED VIEW

TECHNICAL FIELD

This application relates generally to handling database updates, and more particularly, lightweight software programs that dynamically select and incorporate only small portions of database changes for inclusion into the database updates.

BACKGROUND

Large-scale distributed computing platforms typically implement a central (or "core") database that replicates copies of the database to remote (or "edge") databases. To reduce demands on platform resources, database updates could be received and processed at edge servers using lightweight database functions.

BRIEF DESCRIPTION OF THE DRAWINGS

The accompanying drawings constitute a part of this specification and illustrate embodiments of the subject matter disclosed herein.

FIG. 2 depicts a home page of an administrator, according to an embodiment.

DETAILED DESCRIPTION

Figure 1:
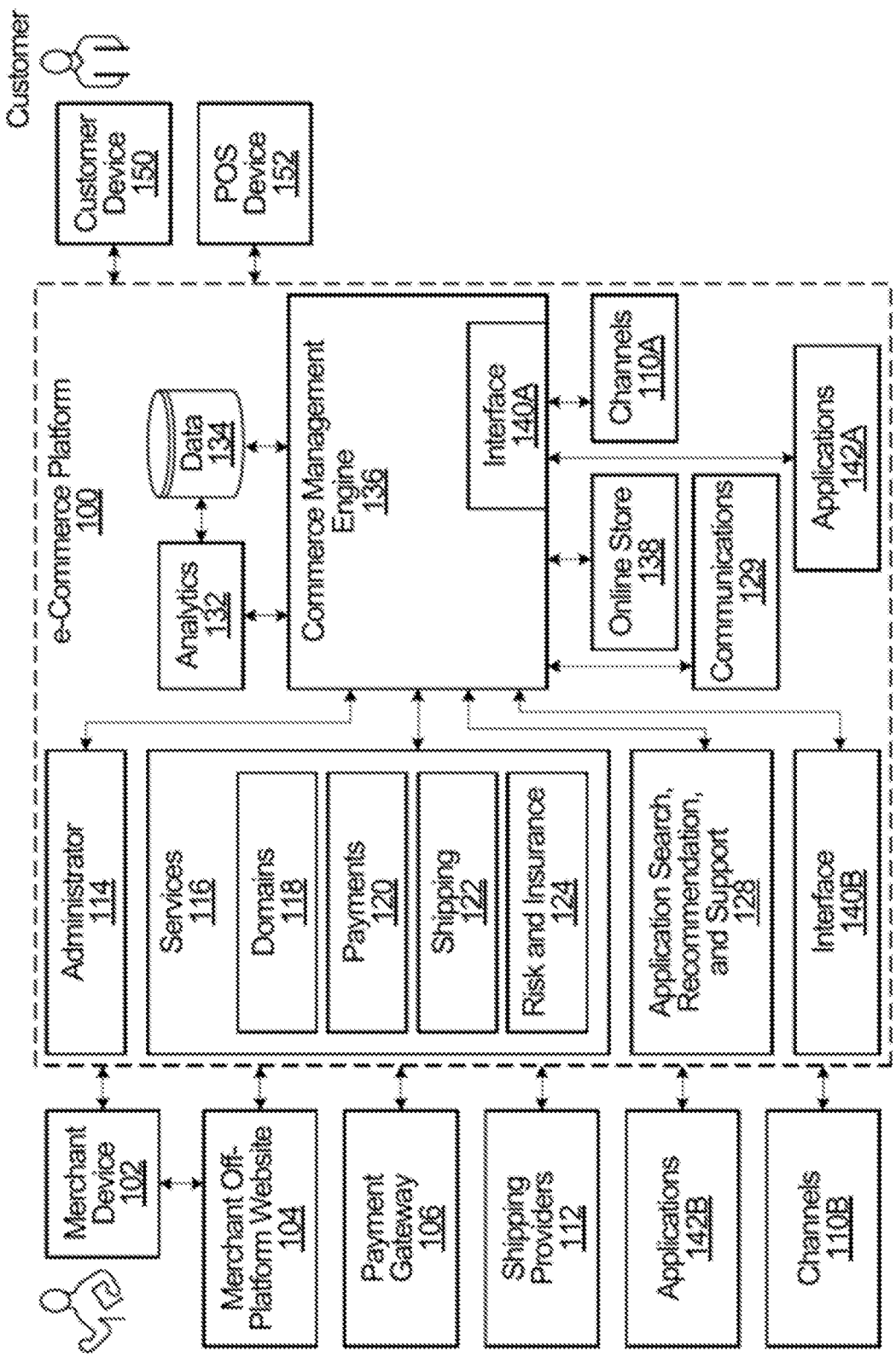
FIG. 1 illustrates an e-commerce platform, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Databases may implement materialized views for representing data of the database and for efficiently performing certain operations. A materialized view in a database is a schema object or snapshot of a pre-configured query script result, where the materialized view is stored in the form of a separate table containing the query results. The database may employ the materialized views to speed up query performance and reduce demands on computing resources of server(s) hosting the database(s). By precomputing the results of the queries and storing the results in the form of the materialized views, database performance can be improved, query times reduced, and demands on computing resources may be reduced. When a user queries a materialized view, the database retrieves the data from the precomputed snapshot table (i.e., the materialized view), rather than executing an initial query script from the user. The materialized view may be useful for complex queries that involve multiple tables or that require significant computation by the host server. The materialized view may also be used to provide a consistent view of data across multiple database tables, databases, applications, or computing systems.

As described herein, a system may update materialized views to reflect changes to an underlying database and use the materialized view to more efficiently update the database itself by committing only updates to the database reflected in modified data. To reduce the demands on computing resources, the database changes could be received and processed using the materialized views and various software-based, lightweight, database functions described herein. In this way, when updating the database, the computing resources need not ingest and process large portions of the database or the entire database.

In addition to improving the performance of a particular database and reducing demands on the host server, maintaining up-to-date materialized views may reduce demands on host servers in larger computing networks. Large-scale distributed computing platforms typically implement a central (or "core") database that replicates copies of the database to remote (or "edge") databases. To reduce the demands on platform resources, the database changes could be received and processed at the edge servers using the materialized views and the various software-based, lightweight, database functions described herein. As a particular example, a core database may contain data related to merchants' online stores hosted on a distributed ecommerce platform. Existing solutions for replicating the core database to edge servers could lead to excessive amounts of network data usage, storage, and compute costs. The existing solutions typically require servers to replicate (or "mirror") a complete replica or portions of the core database at each edge database. However, this approach is no longer practicable because edge servers would require large amounts of memory and propagating database changes to all edge servers would result in significant network traffic.

Embodiments may be deployed according to various optional configurations. In some embodiments, a core database may replicate data to an edge database, and the data may be employed to materialize at the edge in materialized views. Moving the materialization and updating functions to the edge database lowers network cost, but increases compute costs and resource demands. In some embodiments, the core database may materialize data in materialized views with updated data and replicate the updated data and materialized views to the edge or downstream databases. This approach increases network costs, but lowers compute costs. The preferable approach depends on a number of factors, such as the number of edge destination systems that require replicated data, and the amount of extra data is produced by the materialization operations described herein. The example embodiments mentioned above reference instances of a first optional configuration (the core database replicates data to an edge database, and the edge database performs functions using the replicated data generate and update materialized views at the edge). Embodiments, however, may implement the second optional configuration (the core database updates the materialized view using database updates and replicate the materialized view the edge or downstream databases).

Example embodiments may address these issues and may provide additional or alternative benefits. A database may receive database changes containing or indicating modified portions of the database, where the database may receive the database changes as user inputs or as replicated from an upstream database received at periodic intervals or continuously. In addition, the database may obtain (e.g., generate or receive) change log data, such as a binary log ("binlog") data, containing entries indicating the database events, such as change events. The binlog entries indicate, for example, types of information associated with the database records, such as identifiers corresponding to the modified database records in the current database tables.

The server hosting the database (or other server) may execute a log consumer software routine that scans the binlog for database change events. When the log consumer identifies an indication of a change event that certain database records were modified, the log consumer pulls the identifiers of the modified records from the binlog (and/or other types of information). The log consumer may extract the identifiers of the binlog and, in some implementations, parse the modified records from the body of the actual database records from the current database using the identifiers of the modified records indicated by the binlog data. The log consumer then populates and pushes only the identifiers of the modified records into a non-transitory storage location that is accessible to a database streaming bus software program that behaves functionally as an updating queue for the database.

The streaming bus may publish a set of one or more of the identifiers for consumption by instances of materialization workers. A software component of the computer, such as listener code, may detect instances of identifiers in the bus stream. The listener code may then invoke the materialization worker. A materialization worker may be a software object that retrieves the modified database records corresponding to the published identifiers from the bus stream and may generate the various database updates using the modified database, as indicated in the database changes of the change events of the binlog data. The materialization worker may rewrite, update, or otherwise generate a query script for constructing a materialized view of certain database records, including the modified database records. In this way, the materialization worker may generate updates to the database having a much smaller volume of data than conventional approaches that, for example, replicate whole databases or portions of the database. The materialization worker may generate the database updates using only the modified data.

Typically, database operations for updating and committing data modifications may be inherently single-threaded, meaning that there is no way to parallelize it. Conventionally, database updates are executed in serial functions by the host servers, where the database changes are received and incorporated into the existing database. This serial approach, however, may not capitalize on the capabilities on the host servers hosting the databases.

Embodiments described herein may implement computer processors that perform single-threaded software routines for detecting, selecting, and/or queuing database modifications from the binlog data to include in the database updates. Embodiments may implement computer processors that perform parallelized approaches to generating the database updates, including rewriting the query script for generating the materialized view. The computer may execute any number of materialization workers in parallel, where the computer processor invokes each instance of the materialization workers by invoking a corresponding processor thread. In this way, the embodiments may execute parallelized updates to the updates to improve the performance of the update processes, particularly with respect to conventional serialized approaches.

Example E-Commerce Platform

In some embodiments, the methods disclosed herein may be performed on or in association with an online services platform, such as an e-commerce platform 100. Therefore, an example of a commerce platform will be described by way of introduction. However, it should be understood that the e-commerce platform 100 is only one possible example of an online platform and is not intended to be limiting. Another example in the context of a computing device is also described. In that manner, the present disclosure may be implemented in other contexts, and is not necessarily limited to implementation in an e-commerce platform 100 or a user device.

FIG. 1 illustrates an e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors, which may be part of or external to the e-commerce platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In some embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In some embodiments, elements of the e-commerce platform 100 may be implemented to operate on various platforms and operating systems, such as iOS, Android, on the web, and the like (e.g., the administrator 114 being implemented in multiple instances for a given online store for IOS, Android, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In some embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
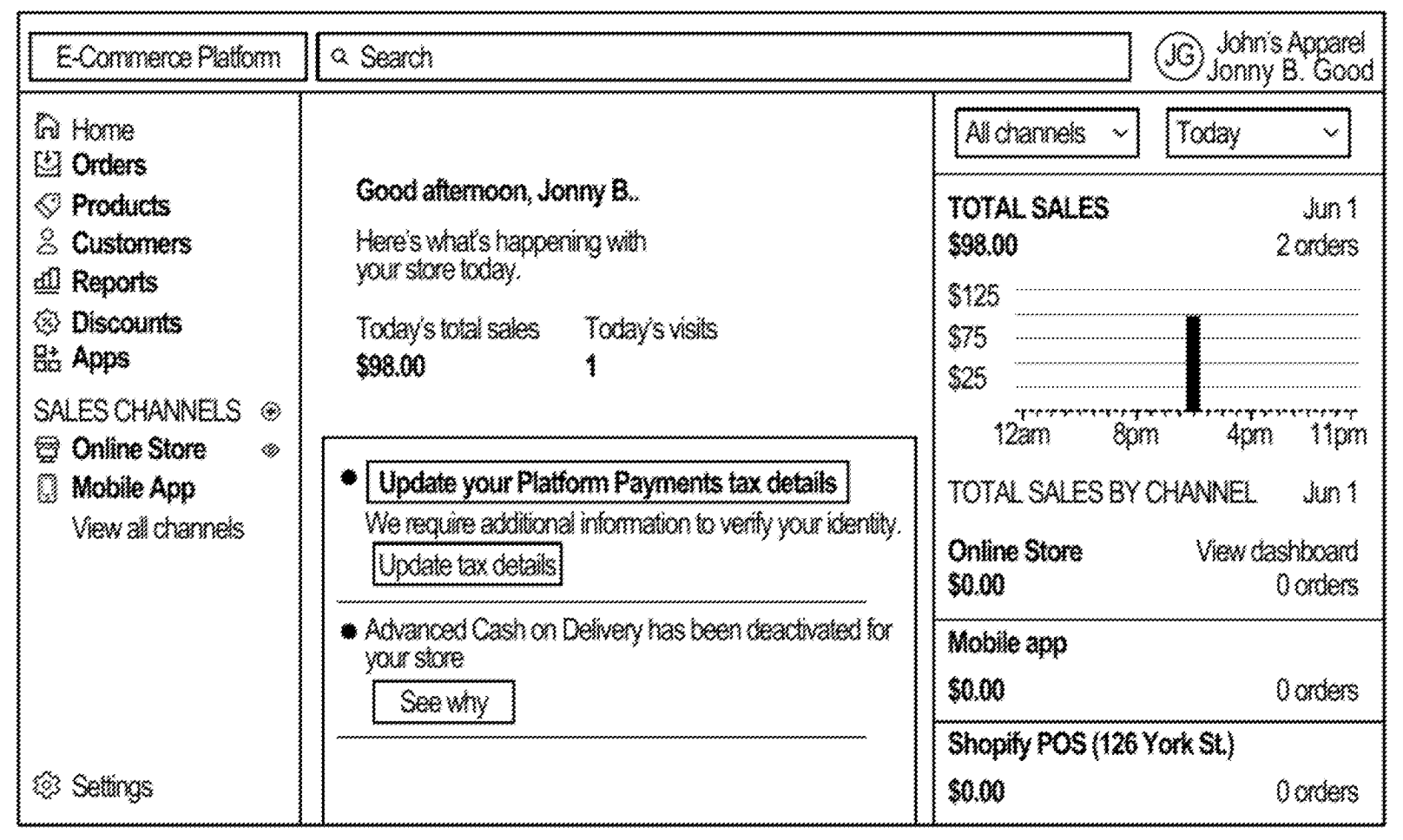

FIG. 2 depicts a non-limiting embodiment for a home page of an administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports, and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g., via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's bank account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in some embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In some embodiments, an application 142A may be provided by the same party providing the platform 100 or by a different party. In some embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if the customer has never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the case of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time.

In some embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information, such as an email address, billing information, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10," and entitlements may be items such as "a 20% discount on the whole order" or "$10 off products X, Y, and Z."

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method that requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that does not provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Figure 3:
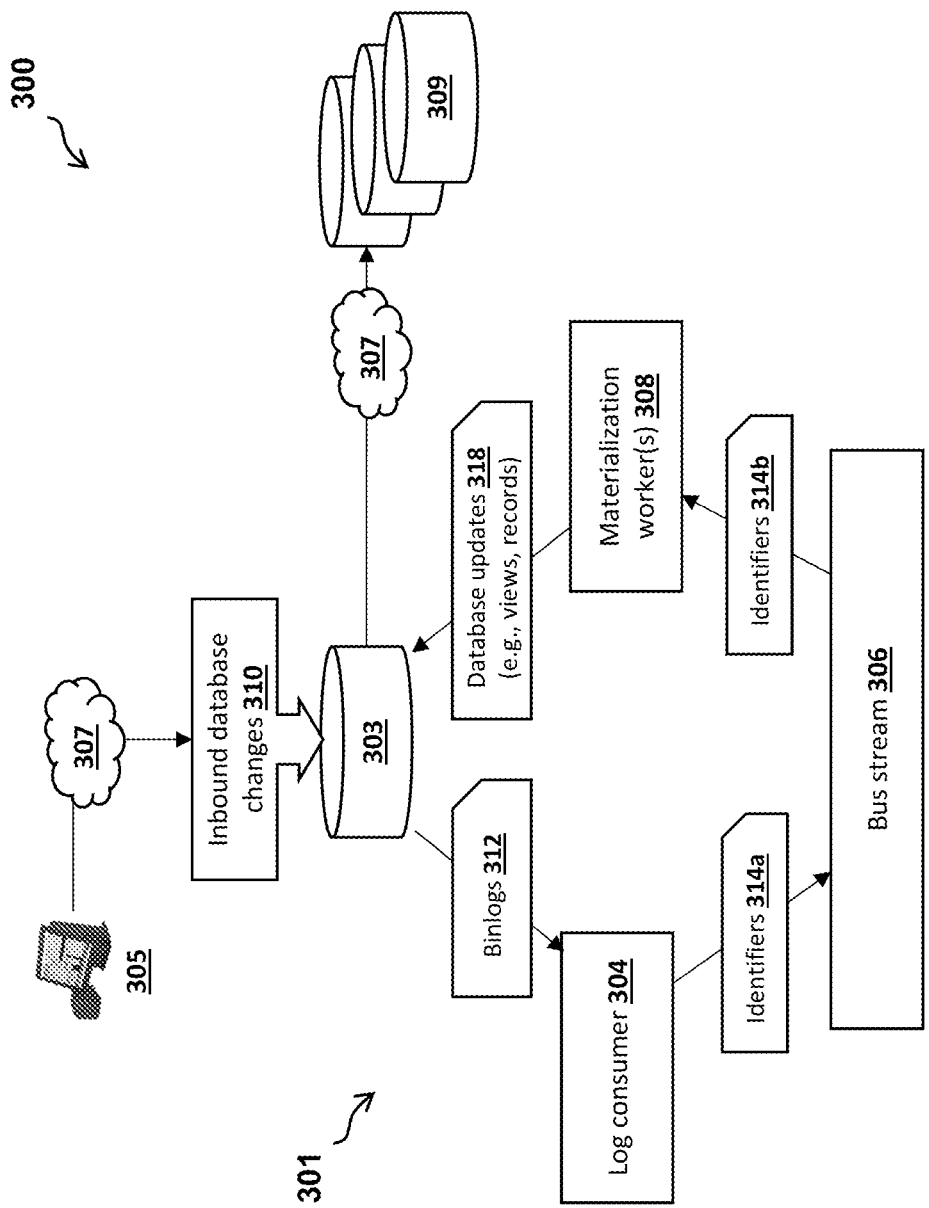
FIG. 3 illustrates components of a system for hosting and managing databases in a distributed computing system, according to an embodiment.

FIG. 3 illustrates components of a system 300 for hosting and managing databases in a distributed computing system. The system 300 includes any number of host servers comprising hardware and software components for hosting a source database 303 (which may function as a core or central database or alternatively as a remote or edge database), log consumers 304, bus streams 306, and materialization workers 308. The system 300 may include any number of user devices 305 (e.g., administrator 114, merchant device 102, customer device 150 of FIG. 1). The devices of the system 300 may communicate with one another via one or more networks 307. The system 300 may include any number of downstream computing devices (e.g., downstream host servers) that host downstream databases 309, which receive database updates 318 generated at, and replicated from, the source database 303 via the one or more networks 307. For case of description and understanding, the host server 301 is shown as hosting the source databases 303, log consumers 304, bus streams 306, and materialization workers 308. However, embodiments may include any number of host servers 301 hosting any number of functional components. For example, in some embodiments, the source database 303, the log consumer 304, the bus stream 306, and the materialization workers 308 may each be hosted on separate host servers 301.

In operation, the source database 303 receives database changes 310 and analyzes a binary log (sometimes referred to as a "binlog" 312) or other type of change log file or data feed to identify any change events. The change event includes any data entry indicating new or updated data in the source database 303. In some cases, the source database 303 receives the changes 310 from the user device 305 as entered by the user directly or at a website hosting a form or web-app that allows the user to enter the changes 310. In some cases, the source database 303 receives the changes 310 from an upstream database (not shown). The one or more host servers 301 may execute software programming defining, or otherwise functioning as, the log consumer 304, the bus stream 306, and the materialization worker 308. The log consumer 304 may identify the change events and extract various types of identifiers 314a associated with particular entries of the binlog 312, which correspond to changes 310 to particular entries of the source database 303 having the one or more selected identifiers 314a. The log consumer 304 stores the one or more selected identifiers 314a into a non-transitory storage medium of the host server 301 used by the bus stream 306 programming as an updating queue. The bus stream 306 publishes the identifiers 314b for consumption by the materialization workers 308, which are instances of a programming that subscribes to notifications published by the bus stream 306. When the materialization workers 308 detect the published identifiers 314b (corresponding to the selected identifiers 314a stored in the memory of the bus stream 306), the materialization workers 308 then pull only the updated payload data from the database changes 310 and generate the database updates 318 for the source database 303 and, in some embodiments, downstream database(s) 309. These database updates 318 include an updated materialized view of the database entries in the source database 303 or downstream database 309. In this way, the source database 303 or downstream databases 309 need not ingest all of the database changes 310 and need only update the portions of the source database 303 reflected in the database updates 318 prepared by the materialization workers 308.

As mentioned, in some embodiments, the system 300 includes the source database 303 logically situated upstream from the downstream databases 309, such that the source database 303 replicates various types of data (e.g., database changes 310, database updates 318) downstream to the downstream database 309 via the network(s) 307. The downstream database 303 may be hosted on one or more downstream computing devices having the hardware and software components capable of hosting the downstream database 309 and performing at least some of the features and operations of the downstream database 309 described herein, such as features and operations of the source database 303. The host server 301 hosting the source database 303 may be in networked communication with downstream computing devices hosting the downstream databases 309, allowing the source database 303 to replicate the database changes 310 or database updates 318 via the network 307 downstream to the downstream database 309.

For case of description and understanding. FIG. 3 depicts the system 300 as having only one or a small number of each component. Embodiments may, however, comprise additional or alternative components, or omit certain components, from those of FIG. 3 and still fall within the scope of this disclosure.

The networks 307 interconnect the components of the system 300, hosting and facilitating communications between the various devices of the system 300. The network 307 may include any number of public and/or private networks. The network 307 may comprise hardware and software components implementing various network and/or telecommunications protocols facilitating communications between the various devices, which may include devices of the system 300 or any number of additional or alternative devices not shown in FIG. 3. The network 307 may be implemented as, for example, a cellular network, a Wi-Fi network, or other wired local area networks (LAN) or wireless LAN, a WiMAX network, or other wireless or wired wide area network (WAN), and the like.

The user device 305 includes any types of computing device comprising hardware and software components capable of performing various processes and described herein. In some cases, the user device 305 may enter the database changes 310 directly to the source database 303. In some cases, the user device 305 accesses a website hosted by the host server 301 or other computing device of system 300, where the user's interactions with the website include various user inputs that indicate the database changes 310.

The source database 303 may be hosted on one or more computing devices, such as the host server 301, having the hardware and software components capable of hosting the source database 303, which includes performing at least some of the source database 303 features and operations described herein. In the example system 300, for instance, the host server 301 hosts the source database 303, though any number of additional or alternative computing devices may host the source database 303.

The host server 301 includes any type of computing device comprising the hardware and software components for hosting the source database 303, such as processors, non-transitory machine-readable storage media, network interfaces, and database software (e.g., database management system (DBMS)). The one or more host servers 301 includes the software and hardware components for performing the various features and functions described herein, including the log consumer 304, the bus stream 306, and the one or more materialization workers 308. As mentioned previously, for case of description and understanding, FIG. 3 shows a host server 301 hosting the source databases 303, the log consumers 304, the bus streams 306, and the materialization workers 308, though embodiments may include any number of host servers 301 that host any number of the functional components (e.g., source database 303, the log consumer 304, the bus stream 306, the materialization workers 308). For instance, in some embodiments, the source database 303, the log consumer 304, the bus stream 306, and the materialization workers 308 are each hosted on separate host servers 301.

In some cases, the source database 303 may receive the inbound database changes 310 from the user device 305, where the user enters the user inputs resulting in the changes 310 to the source database 303. For example, the user and user device 305 (e.g., merchant device 102, customer device 150) may interact with a website (e.g., merchant online store 104) or online web-app (e.g., application 142A, application 142B), entering certain user inputs that cause changes 310 to corresponding database tables or database records of the source database 303 (e.g., updates to user account information, user registers for a new account) and result in the inbound changes 310 to the source database 303. Alternatively, the user and user device 305 (e.g., administrator 114) may interact directly with aspects of the source database 303 (e.g., data records, tables, views), entering user inputs that cause changes 310 to corresponding database tables or database records of the source database 303 and result in the inbound changes 310 to the source database 303.

Additionally or alternatively, in some cases, the source database 303 may receive the inbound database changes 310 from an optional upstream database (not shown), where the upstream database replicates database content to the source database 303.

Similarly, in some implementations, the source database 303 may replicate some or all of the content from the source database 303 to any number of downstream databases 309 via the network 307, after the host server(s) 301 updated the source database 303 of the host server 301. The host server 301 may replicate portions of the source database 303, such as the inbound database changes 310 or the database updates 318 generated by the materialization workers 308.

Embodiments need not include the optional upstream database (not shown). Likewise, embodiments need not include any downstream databases 309. For instance, in some embodiments, the source database 303 may be an initial or hierarchical parent to any number of downstream databases 309. In some embodiments, the source database 303 may be the hierarchal child or downstream from any number of upstream databases. Alternatively, in some embodiments, the source database 303 may be a standalone or isolated database instance, where the source database 303 primarily or exclusively receives the inbound database updates 310 from the user device 305 or via a user interface of the host server 301.

The host server 301 may generate or receive a change log, such as the binlog 312. The binlog 312 (or other change log) includes data entries in which devices of the system 300 may record the changes 310 to various types of data (e.g., records, tables, views, scripts, queries) of the source database 303. The binlog 312 is a change log file that contains entries representing database modifications or changes 310, including inserts, updates, and deletes. The binlog 312 is typically used for tracking modifications to the source database 303 and for database replication, where the changes 310 made to the source database 303 or upstream database are propagated downstream to, for example, the source database 303 and/or one or more downstream databases 309. The binlog 312 is also useful for database recovery, allowing administrators to replay the recorded modifications to restore the source database 303 to a previous state. The host server 301 may generate, receive, or update the binlog 312 and store the binlog 312 into the non-transitory storage of the host server 301. The binlog 312 contains a chronological sequence of "events" as entries of data when the data stored in the source database 303 was modified, including various types of metadata (e.g., transaction identifiers (ID), timestamps of events) and/or the updated database payload (e.g., database records, tables, views). The binlog 312 contains database change "events" that describe various database changes 310, such as table creation operations or updates to a table. In some cases, the binlog 312 also contains events for executable commands that potentially caused certain changes (for example, a DELETE command for certain rows that did not match a condition for execution). The binlog 312 may be queried or parsed using software tools of the host server 301 (or other devices of the system 300), including DBMS software or the various types of software operations described herein (e.g., log consumer 304, bus stream 306, workers 308).

In some implementations, the host server 301 may execute software (e.g., DBMS software) that tracks updates and generates or updates to the binlog 312 (or other type of change log) according to the database modifications received in the inbound changes 310. As an example, an administrative user may enter modifications directly to certain database records of the source database 303, such that the source database 303 receives the changes 310 from the user device 305 and the DBMS or other software of the host server 301 detects the changes 310 and updates the binlog 312. Additionally or alternatively, in some implementations, the host server 301 may receive the binlog 312 as published from an upstream database (or other upstream data source) in conjunction with receiving the database changes 310.

The log consumer 304 analyzes a stream or batch of binlog entries to scan and identify the change events, as indicated by the binlog 312. In some cases, the log consumer 304 continuously receives and analyzes the binlog data to detect the change events. Additionally or alternatively, the host server 301 invokes the consumer 304 at a preconfigured interval or in response to a trigger input (e.g., the host server 301 receives the inbound database updates). In this way, the log consumer 304 may detect only those portions of the database changes 310 relevant to the source database 303, and the host server 301 only ingests the binlog 312 and need not download or otherwise ingest more data than necessary in order to keep the source database 303 and downstream databases 309 up-to-date.

When the log consumer 304 identifies a change event in the binlog 312, indicating that certain database records were modified, the consumer 304 selects or extracts, from the binlog 312, one or more identifiers 314a (e.g., transaction identifier, record identifier) and/or other types of information that correspond to modified data. The log consumer 304 parses the modified data from the body of database content or the inbound database changes 310 (received from the user device 305 or replicated from the source database 303), according to the selected identifiers 314a extracted from the binlog 312 that correspond to the inbound modified data. The log consumer 304 then populates or pushes the selected identifiers 314a (of the modified data) into a database streaming bus ("bus stream 306"), which behaves functionally as an updating queue for the source database 303.

The bus stream 306 includes software for database transaction messaging and stream processing (e.g., Apache Kafka®, Google Cloud Pub/Sub®, RabbitMQ®). In some embodiments, the bus stream 306 functions according to a publish-subscribe messaging architecture, in which the bus stream 306 permits the log consumer 304 to publish, write, or otherwise generate data (e.g., identifiers 314a selected from the binlog 312) into a non-transitory memory location used by the bus stream 306. The bus stream 306 is accessible to preconfigured instances of materialization workers 308, which are software objects programmed to subscribe, detect, and read the published identifiers 314b from the bus stream 306.

The bus stream 306 publishes the published identifiers 314b that the one or more materialization workers 308 may detect and handle. A listener or other triggering software routine of the materialization workers 308 subscribes to the bus stream 306, allowing the materialization workers 308 to detect the published identifiers 314b. The host server 301 then invokes or instantiates an instance of the materialization workers 308.

The materialization worker 308 may update the data of the source database 303 according to the modified data received in the database changes 310. The materialization worker 308 generates a database update 318 using the modified data indicated by the identifier 314b. In operation, the bus stream 306 receives and publishes the sets of identifiers 314b for consumption by the instance of the materialization worker 308. The materialization worker 308 reads the identifiers 314b and pulls, from the source database 303 only the portions of the modified records corresponding to the identifiers 314b (as extracted as the selected identifiers 314a of the binlog 312). In this way, the materialization worker 308 may update 318 the source database 303 using only these particular modified database records indicated by the identifiers 314b (as extracted as the selected identifiers 314a of the binlog 312).

Each of the materialization workers 308 represents an instance of the materialization worker 308 object code, where the processor of the host server 301 invokes each instance when the listener code detects a particular set of one or more published identifiers 314b at the bus stream 306. The host servers 301 may execute the materialization workers 308 in parallel, using parallel threads of the processor. The host servers 301 invokes and executes each particular materialization worker 308 using a corresponding thread, such that the host servers 301 executes each materialization worker 308 on a dedicated execution thread, allowing the host servers 301 to execute each materialization worker 308 in parallel to one another.

The source database 303 may contain one or more materialized views representing the database records in the source database 303. A materialized view may be a predefined, flattened, secondary table having some or all of the data in the source database 303. The source database 303 generates a materialized view using a query script that includes a list of data fields for the materialized view and one or more database functions for building the materialized view (e.g., JOIN or UNION multiple tables). To update the source database 303, the materialization worker 308 generates the query script for generating the materialized view and/or other queries that include the identifiers 314b associated with the modified database records in the database changes 310. The outputs of the materialization worker 308 (or other software component of the source database 303) executing these query scripts may include one or more database updates 318 containing, for example, the modified data and/or the modified materialized views.

The materialization worker 308 may identify dependencies between the modified database records and existing records in the source database 303 and update the query script for the materialization view to account for the dependencies between the database records or other dependent aspects of the source database 303. The materialization worker 308 or other software routine (e.g., SQL query parser) executed by the host server 301 may examine a query script for the materialized view.

The host server 301 may execute software routines for identifying dependencies between components of the source database 303. These translation routines are programmed with mappings of the database tables or database records from which the materialized views depend. In this way, when the source database 303 receives a change event, the host server 301 is configured to determine each of the database tables that depend from a given database record entry (e.g., row of a table). The source database 303 or other software component of the host server 301 may then determine, for example, that dependent tables or database records should be updated due the dependencies from modified database records. As another example, when executing or updating the query scripts for constructing the materialized views, the materialization worker 308 may execute the translation routines for identifying the dependencies of the dependent database records for the materialized views. In operation, the materialization worker 308 may analyze the database relationships to determine dependencies between the modified database records and the set of database records of a database table corresponding to the published identifiers 314b. In some implementations, the materialization worker 308 may determine the dependencies between the modified data records and the set of database records by referencing the graph data structure indicating the dependencies, according to the translation routines. Using the graph, the materialization worker may review the relationship for a source table containing the modified data records to determine a primary key that establishes a dependency for the database table containing the set of database records. The materialization worker 308 may rewrite or revise the query script's functions for generating the materialized view using the modified data corresponding to the published identifiers 314b (of the selected identifiers 314a).

In many cases, the materialization worker 308 may rewrite the query for generating an updated materialization view having a one-to-one relationship between modified database records and a database table. The one-to-one relationship may occur where both the modified database record (e.g., row) of a given database table and the row of the materialized view row or of another database table each use the same primary key in a given data field. The database changes 310 that modify entries (or rows) of the given database table will oftentimes have a common primary database key corresponding to entries of the materialized view or other database tables. The materialization worker 308 may proceed with generating the database updates 318, such as the updates the materialized view, when the materialization worker 308 identifies a one-to-one relationship. For instance, if the log consumer 304 determines that a database record (e.g., a row) of a database table was modified, and if the materialization worker 308 determines that a row of the materialized view maintains a one-to-one relationship with the corresponding modified database record, then the materialization worker may proceed with performing the query rewrite updating the script query for constructing the materialization view.

In some circumstances, however, if the log consumer 304 detects the modified database record of the database table, and if the materialization worker 308 determines that a number of rows of the materialized view depends, in a many-to-many relationship, from the modified database record, then the materialization worker 308 may resolve the many-to-many relationship before rewriting the query script for construction the materialization view. The materialization worker 308 may query the source database 303 to determine which materialized view rows depend on the modified database record of the database table and normalizes the changes 310 across any number of database tables according to a particular common primary key. The materialization worker 308 may then rewrite the query script for generating the materialized view based on those results.

As an example, the source database 303 for a blog or a news site includes data about articles and authors. A user may submit a request to render a list of articles with the name of a particular author. The query script executed by the source database 303 may, for example, perform a SELECT function on data fields such as "title" and perform a JOIN with an Authors table. In some cases, multiple articles would be associated with the same author. In this example, a LEFT JOIN of the Author table would be on the right side of another table in the JOIN function. In some circumstances, an author may have changed the spelling of the author's name. That means all of the rows in the materialized table that contains article titles and author would need to be updated, because each of those entries would contain the same duplicate data that comes from the LEFT JOIN. When the Author table is updated, the materialization work 308 needs to do an additional lookup because the materialization worker 308 would update the materialized view for the Articles. The materialization worker 308 would reference, for example, an Author ID needed to use for the update, but the materialization worker 308 does not have the primary key (e.g., Author ID, Article ID) needed for the update. In these circumstances, the materialization worker 308 executes a query to the source database 303 requesting each of the articles written by this specific author, including the primary keys as the Article IDs. The materialization worker 308 then receives a list of, e.g., the Article IDs as the common primary keys. The materialization worker 308 may then update the materialized view (and the query script for constructing the materialized view) by including the Article IDs into the query script. The materialization worker 308 may then execute a replacement in the materialization view to select each database record with each of the Article IDs created by the particular Author ID that will be affected as a result of the change of author's name, as indicated by dependencies of the graph. In this way, the materialization worker 308 may normalize the many-to-many relationships to one-to-one relationships used when rewriting the query script for constructing the materialized view.

Example Processes

Figure 4A:
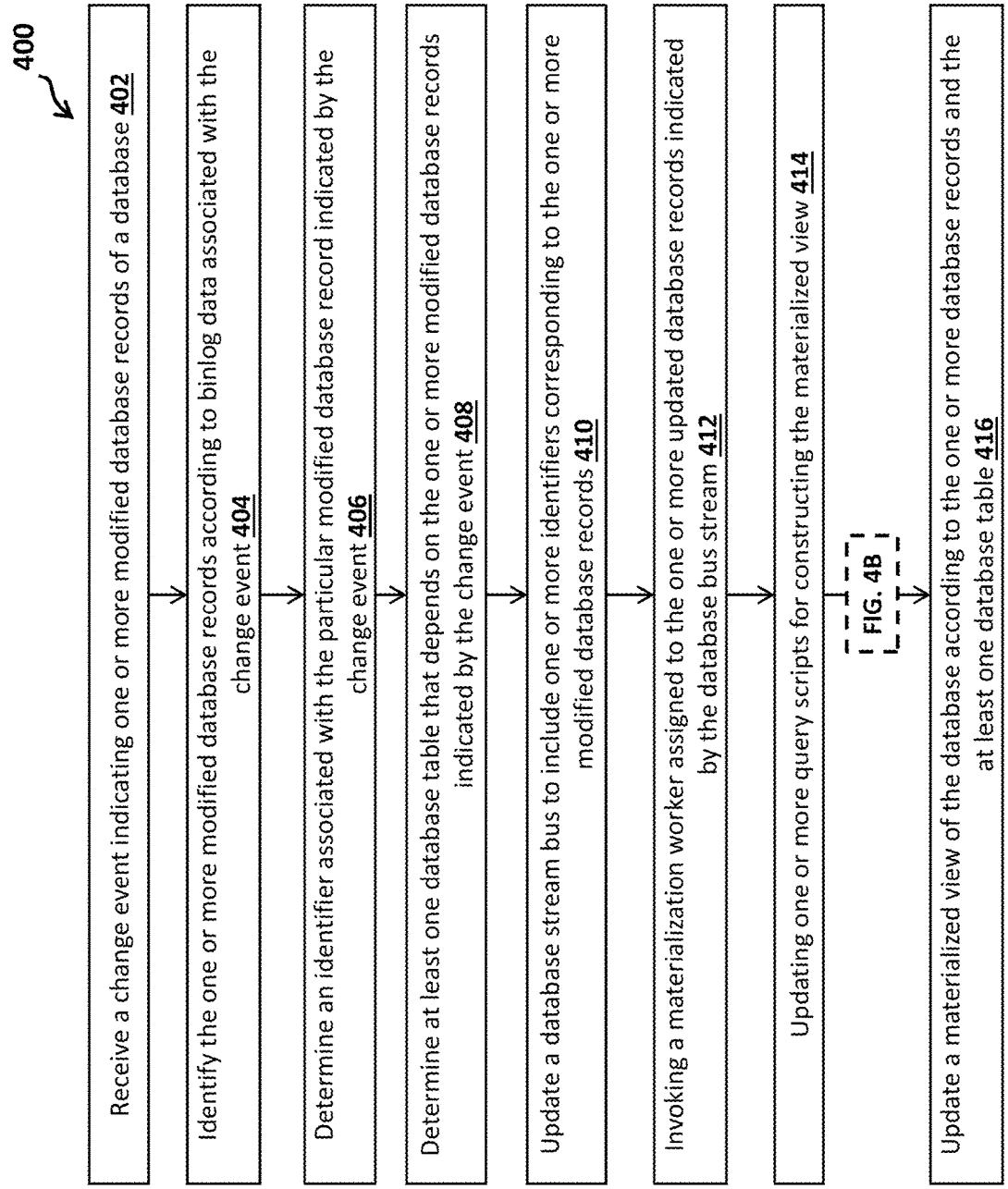
FIGS. 4A-4B shows optional operations of the method for committing updates to a database using materialized views and lightweight software functions, according to an embodiment.
Figure 4B:
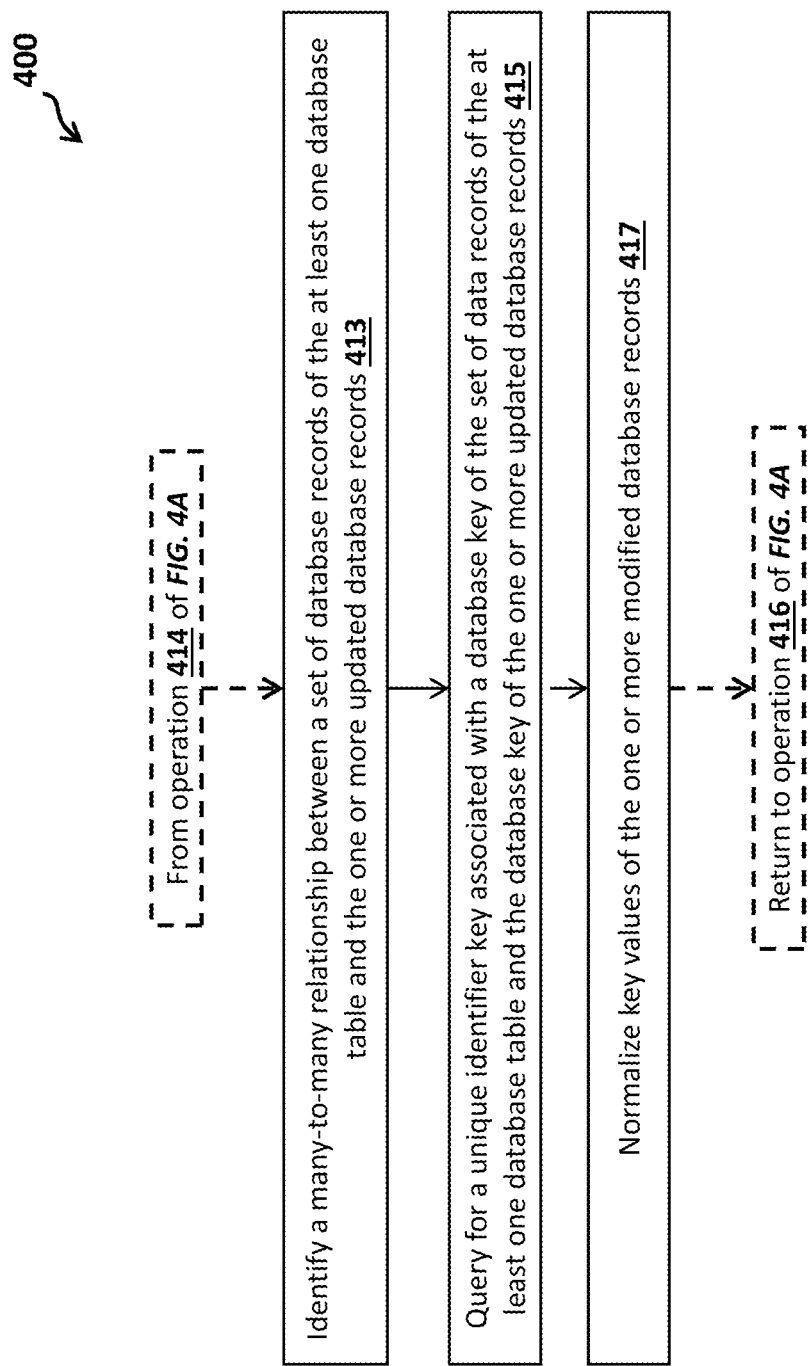

FIGS. 4A-4B shows optional operations of the method 400 for committing updates to the database using materialized views and lightweight software functions. Embodiments may include additional, fewer, or different operations than those described in the method 400. For case of description and understanding, a computer (e.g., host server 301, data 134) performs the operations, functions, and features of the method 400. The computer may include one or more computing devices comprising the software and hardware components capable of performing the operations, features, and functions described herein. Embodiments, however, may include any number of computing devices or processors that perform the various operations of the method 400 or otherwise described in FIGS. 4A-4B, and still fall within the scope of this disclosure. As an example, in some embodiments, a computer may host the database and execute the functions and features described herein, which may include software programming for a log consumer, a database bus stream, and materialization workers, among other types of software functions. As another example, in some embodiments, a first computer may be the server that hosts the database and a second computer may be another server that executes various functions and features described herein, such as the software programming for the log consumer, the database bus stream, and the materialization workers, among other types of software functions. Moreover, embodiments may include additional or alternative operations, or omit certain operations, than the operations mentioned in the description of the method 400 and still fall within the scope of this disclosure.

In operation 402, the computer obtains a change event indicating one or more modified database records of a database. The computer may receive database changes containing one or more modified database records. The computer may receive or generate a binlog or other type of change log containing event data indicating one or more database events, which include the one or more change events. The entries of the binlog may include various types of data associated with the instances of the modified database records, including one or more identifiers indicating each particular modified database record indicated by the binlog.

In some cases, the computer receives the binlog as a data stream indicating the database events or real time updates generated by a DBMS or other software component of the database. In some cases, the binlog may be a batch file or other machine-readable file format containing the database changes, indicating the modified database records. Additionally or alternatively, the computer may identify changes to the database, automatically or in response to user inputs. The computer may then generate binlog entries indicating the modified data records that the computer identified in the database changes.

In operation 404, the computer identifies the one or more modified database records according to binlog data containing the entries associated with the change event. Along with or contemporaneous to obtaining the binlog data indicating the database changes, the computer may execute a log consumer software routine. The log consumer may scan the binlog data for entries indicating the database change event(s), which correspond to and indicate one or more modified database records.

In operation 406, the computer, executing the log consumer, determines one or more identifiers associated with one or more corresponding modified database record indicated by the change event in the binlog data. The log consumer may identify and select the identifiers in the binlog entries corresponding to the modified database records. The log consumer may then push or store the selected identifier into a non-transitory storage media associated with, and accessible to, a database bus stream program.

Notably, the computer need not ingest a body (or payload) either of an entire database or the changed portions of the database in order to implement database updates as described herein. The log consumer may detect the modified database records using the binlog, select the binlog entries containing identifiers for the modified database records, and push the selected identifiers to the bus stream. The log consumer need not push any additional information or database payload data (e.g., database records, tables, views, query scripts) into the bus stream, though some implementations may push certain types of information from the modified database records in addition to the identifiers. In some implementations, the log consumer may extract an identifier from the binlog entry and/or parse an identifier (or other types of information) away from the body of the modified database record, and then push such identifier(s) into the bus stream.

Optionally, in operation 408, the computer determines a database record or database table that depends on the one or more modified database records indicated by the change event. The log consumer or other software routine (e.g., SQL query parser) executed by the host computer may examine a query script or database relationships to determine dependencies between the modified database records and certain tables, records, views, or other types of interrelated dependent data within the database. In some implementations, the computer may determine the dependencies between the modified data records by referencing a graph data structure indicating the dependencies. Using the graph, the computer may review the relationship between one or more source tables containing a modified data record to determine a primary key that other tables depend on. In some cases, the computer pushes dependent records to the bus stream. In some cases, the computer stores the dependency information into a non-transitory storage for later reference.

In operation 410, the log consumer or other software routine of the computer may update the database bus stream to include the one or more identifiers corresponding to the one or more modified database records in the identified change event. The bus stream may publish the identifiers corresponding to the one or more modified database records for consumption by materialization workers.

In operation 412, the computer invokes a materialization worker program assigned to a set of one or more updated database records indicated by the database bus stream. A listener program routine executed by the materialization worker or other software component of the computer may detect the published set of identifiers and, in response, invoke or instantiate an instance of the materialization worker software object. The computer may invoke and execute a corresponding processor thread used to execute the materialization worker, such that the computer's processor executes one or more materialization workers using one or more corresponding parallel threads. In this way, the computer executes any number of parallelized materialization workers that consume a continuing series of published sets of identifiers.

In operation 414, the computer, executing the materialization worker, updates one or more query scripts for constructing the materialized view and generating and committing database updates, based upon the modified database records in the database change events indicated by the binlog data. The materialization worker reads the identifiers of the set of published identifiers and pulls only the corresponding modified data records from the body of the database payload data. In generating the database updates, the materialization work uses only the body of the database payload data of the modified database records indicated by the set of published identifiers consumed by the materialization worker.

The materialization worker may further update or generate a new materialized view for updating the database. Ordinarily, the database generates the materialized view using a defined (e.g. preconfigured and stored) query script that indicates a list of data fields defining the materialized view and uses one or more database functions for building the materialized view (e.g., JOIN or UNION multiple tables). To update the database, the materialization worker may rewrite, update, or otherwise generate the query script query for generating the materialized view. The updated query script includes the set of published identifiers associated with the modified database records.

In some embodiments, the materialization worker (or other software component) may identify dependencies between the modified database records and existing records in the database and update the materialization view query script to account for the dependent records.

Optionally, in some cases, the materialization worker may perform a query of the database to resolve a contradiction or ambiguity in determining dependencies, as shown in optional operations 413-417 of FIG. 4B after operation 414 of FIG. 4A.

With reference to FIG. 4B, in operation 413, the materialization worker identifies a many-to-many relationship between the one or more modified database records and a set of database records of the at least one database table. In operation 415, the materialization worker (or other software component of the computer) executes a query for a unique identifier key associated with both a database key of the set of data records of the at least one database table and with the database key of the one or more modified database records.

The materialization worker or other software routine (e.g., SQL query parser) executed by the host computer may examine a query script for the materialized view. The materialization worker may analyze the database relationships to determine dependencies between the modified database records and the set of database records of the at least one database table. In some implementations, the materialization worker may determine the dependencies between the modified data records and the set of database records by referencing the graph data structure indicating the dependencies. Using the graph, the materialization work may review the relationship between the source table containing the modified data records to determine a primary key that establishes a dependency for the at least one database table containing the set of database records. In this way the materialization worker may detect the instances of the many-to-many relationships. In operation 417, the materialization worker may normalize the many-to-many relationships to one-to-one relationships, which the materialization worker uses when rewriting the query script for constructing the materialized view.

With reference to FIG. 4A, in operation 416, the materialization worker updates the materialized view of the database according to the one or more database records and the at least one database table. The materialization worker (or other software component of the computer) executes the query script that generates the updated materialization view, which may indicate the portions of the body of the database corresponding to the modified database records indicated by the database binlogs. The materialization may commit the database updates the database according to the materialized view and the related portions of the database.

In some embodiments, a processor-implemented method comprises obtaining, by a computer, a change event indicating one or more modified database records of a database; determining, by the computer, at least one database table that depends on the one or more modified database records indicated by the change event; and updating, by the computer, a materialized view of the database according to the one or more modified database records and the at least one database table.

In some implementations, the database receives a plurality of database records including the one or more modified database records replicated from a source database.

In some implementations, the database receives the one or more modified database records according one or more user inputs entered at a user device.

In some implementations, obtaining the change event includes identifying, by the computer, the one or more modified database records according to change log data associated with the change event.

In some implementations, the method includes, for each particular modified database record, determining, by the computer, an identifier associated with the particular modified database record indicated by the change event.

In some implementations, the method includes updating, by the computer, a database stream bus to include one or more identifiers corresponding to the one or more modified database records.

In some implementations, the method includes executing, by the computer, a materialization worker assigned to the one or more modified database records as indicated by a database stream bus. The materialization worker identifies the at least one database table and updates the materialized view.

In some implementations, the computer invokes a separate processor thread for each respective materialization worker.

In some implementations, updating the materialized view includes updating, by the computer, a query for constructing the materialized view based upon the change event.

In some implementations, the method includes, responsive to identifying a many-to-many relationship between a set of database records of the at least one database table and the one or more modified database records, querying, by the computer, for a unique identifier key associated with a database key of the set of data records of the at least one database table and the database key of the one or more modified database records; and normalizing, by the computer, data values of the database key of the first set of data records or the data values of the database key of the one or more modified database records.

In some embodiments, a system comprises a database hosted by non-transitory machine-readable media configured to store a plurality of database records; and a computer comprising a processor. The computer is configured to obtain a change event indicating one or more modified database records of the database; determine at least one database table that depends on the one or more modified database records indicated by the change event; and update a materialized view of the database according to the one or more modified database records and the at least one database table.

In some implementations, the database receives a plurality of database records including the one or more modified database records replicated from a source database.

In some implementations, the database receives the one or more modified database records according one or more user inputs entered at a user device.

In some implementations, when obtaining the change event, the computer is further configured to identify the one or more modified database records according to change log data associated with the change event.

In some implementations, the computer is further configured to, for each particular modified database record, determine an identifier associated with the particular modified database record indicated by the change event.

In some implementations, the computer is further configured to update a database stream bus to include one or more identifiers corresponding to the one or more modified database records.

In some implementations, the computer is further configured to execute a materialization worker assigned to the one or more modified database records as indicated by a database stream bus. The materialization worker identifies the at least one database table and updates the materialized view.

In some implementations, the computer invokes a separate processor thread for each respective materialization worker.

In some implementations, when updating the materialized view, the computer is further configured to update a query for constructing the materialized view based upon the change event.

In some implementations, the computer is further configured to, responsive to identifying a many-to-many relationship between a set of database records of the at least one database table and the one or more modified database records, query for a unique identifier key associated with a database key of the set of data records of the at least one database table and the database key of the one or more modified database records; and normalize data values of the database key of the first set of data records or the data values of the database key of the one or more modified database records.

In some embodiments, a non-transitory machine-readable storage medium having computer-executable instructions stored thereon that, when executed by one or more processors, cause the one or more processors to perform operations comprising: obtaining a change event indicating one or more modified database records of a database; determining at least one database table that depends on the one or more modified database records indicated by the change event; and updating a materialized view of the database according to the one or more modified database records and the at least one database table.

The foregoing method descriptions and the process flow diagrams are provided merely as illustrative examples and are not intended to require or imply that the operations of the various embodiments must be performed in the order presented. The operations in the foregoing embodiments may be performed in any order. Words such as "then," "next," etc. are not intended to limit the order of the operations; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The operations of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A processor-implemented method comprising:
obtaining, by a computer, a change event indicating one or more modified database records of a database corresponding to one or more identifiers in a database bus stream;
identifying, by the computer, one or more dependencies between one or more database tables of the database associated with the one or more modified database records corresponding to the one or more identifiers in the database bus stream;
determining, by the computer, at least one database table that depends on the one or more modified database records indicated by the change event according to the one or more dependencies identified in the one or more database tables; and
updating, by the computer, a materialized view of the database according to the one or more modified database records corresponding to the one or more identifiers in the database bus stream and the at least one database table.

2. The method according to claim 1, wherein the database receives a plurality of database records including the one or more modified database records replicated from a source database.

3. The method according to claim 1, wherein the database receives the one or more modified database records according one or more user inputs entered at a user device.

4. The method according to claim 1, wherein obtaining the change event includes identifying, by the computer, the one or more modified database records according to change log data associated with the change event.

5. The method according to claim 1, further comprising, for each particular modified database record, determining, by the computer, an identifier associated with the particular modified database record indicated by the change event.

6. The method according to claim 1, further comprising updating, by the computer, the database bus stream to include the one or more identifiers corresponding to the one or more modified database records.

7. The method according to claim 1, further comprising executing, by the computer, a materialization worker assigned to the one or more modified database records as indicated by the database bus stream,
wherein the materialization worker identifies the at least one database table and updates the materialized view.

8. The method according to claim 7, wherein the computer invokes a separate processor thread for each respective materialization worker.

9. The method according to claim 1, wherein updating the materialized view includes updating, by the computer, a query for constructing the materialized view based upon the change event.

10. The method according to claim 1, further comprising:
responsive to identifying a many-to-many relationship between data values of a set of database records of the at least one database table and the data values of the one or more modified database records:
querying, by the computer, for a unique identifier key associated with a database key of the set of database records of the at least one database table and the database key of the one or more modified database records; and normalizing, by the computer, the many-to-many relationship to a one-to-one relationship for the data values of the database key of the set of database records or the data values of the database key of the one or more modified database records.

11. A system comprising:
a database hosted by non-transitory machine-readable media configured to store a plurality of database records; and
a computer comprising a processor configured to:
obtain a change event indicating one or more modified database records of the database corresponding to one or more identifiers in a database bus stream;
identify one or more dependencies between one or more database tables of the database associated with the one or more modified database records corresponding to the one or more identifiers in the database bus stream;
determine at least one database table that depends on the one or more modified database records indicated by the change event according to the one or more dependencies identified in the one or more database tables; and
update a materialized view of the database according to the one or more modified database records corresponding to the one or more identifiers in the database bus stream and the at least one database table.

12. The system according to claim 11, wherein the database receives a plurality of database records including the one or more modified database records replicated from a source database.

13. The system according to claim 11, wherein the database receives the one or more modified database records according one or more user inputs entered at a user device.

14. The system according to claim 11, wherein when obtaining the change event, the computer is further configured to identify the one or more modified database records according to change log data associated with the change event.

15. The system according to claim 11, wherein the computer is further configured to, for each particular modified database record, determine an identifier associated with the particular modified database record indicated by the change event.

16. The system according to claim 11, wherein the computer is further configured to update the database bus stream to include the one or more identifiers corresponding to the one or more modified database records.

17. The system according to claim 11, wherein the computer is further configured to execute a materialization worker assigned to the one or more modified database records as indicated by the database bus stream, wherein the materialization worker identifies the at least one database table and updates the materialized view.

18. The system according to claim 17, wherein the computer invokes a separate processor thread for each respective materialization worker.

19. The system according to claim 11, wherein, when updating the materialized view, the computer is further configured to update a query for constructing the materialized view based upon the change event.

20. The system according to claim 11, wherein the computer is further configured to:
responsive to identifying a many-to-many relationship between data values of a set of database records of the at least one database table and the data values of the one or more modified database records:
query for a unique identifier key associated with a database key of the set of database records of the at least one database table and the database key of the one or more modified database records; and
normalize the many-to-many relationship to a one-to-one relationship for the data values of the database key of the set of database records or the data values of the database key of the one or more modified database records.

21. A non-transitory machine-readable storage medium having computer-executable instructions stored thereon that, when executed by one or more processors, cause the one or more processors to perform operations comprising:
obtaining a change event indicating one or more modified database records of a database corresponding to a one or more identifiers in a database bus stream;
identifying one or more dependencies between one or more database tables of the database associated with the one or more modified database records corresponding to the one or more identifiers in the database bus stream;
determining at least one database table that depends on the one or more modified database records indicated by the change event according to the one or more dependencies identified in the one or more database tables; and
updating a materialized view of the database according to the one or more modified database records corresponding to the one or more identifiers in the database bus stream and the at least one database table.

* * * * *